US012793409B2

(12) United States Patent
Yokote et al.

(10) Patent No.: US 12,793,409 B2
(45) Date of Patent: Nov. 10, 2026

(54) SYSTEM, METHOD, AND RECORDING MEDIUM

(71) Applicant: NEC Corporation, Tokyo (JP)

(72) Inventors: Toshimichi Yokote, Tokyo (JP); Yosuke Kimura, Tokyo (JP); Chisato Sugawara, Tokyo (JP); Yusuke Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 232 days.

(21) Appl. No.: 18/713,226

(22) PCT Filed: Dec. 22, 2021

(86) PCT No.: PCT/JP2021/047468
§ 371 (c)(1),
(2) Date: May 24, 2024

(87) PCT Pub. No.: WO2023/119462
PCT Pub. Date: Jun. 29, 2023

(65) Prior Publication Data

US 2025/0029229 A1 Jan. 23, 2025

(51) Int. Cl.

| | |
|---|---|
| ***G06V 20/10*** | (2022.01) |
| ***G06F 3/04817*** | (2022.01) |
| ***G06T 7/00*** | (2017.01) |
| ***G06T 11/65*** | (2026.01) |

(52) U.S. Cl.
CPC ........ *G06V 20/176* (2022.01); *G06F 3/04817* (2013.01); *G06T 7/0004* (2013.01); *G06T 11/65* (2026.01)

(58) Field of Classification Search
CPC ......... G06T 7/0004; G06T 11/60; G06T 7/00; G06F 3/04817; G06V 20/176
See application file for complete search history.

(56) References Cited

U.S. PATENT DOCUMENTS

2020/0041284 A1* 2/2020 Liu ......................... G06F 16/29
2020/0294221 A1* 9/2020 Oe ........................ G06V 20/588

FOREIGN PATENT DOCUMENTS

CN 113628164 * 11/2021 ............... G06N 3/08
JP 2018-098567 A 6/2018
JP 2019057192 * 4/2019 ............. G06Q 50/06
(Continued)

OTHER PUBLICATIONS

International Search Report for PCT Application No. PCT/JP2021/047468, mailed on Apr. 5, 2022.
(Continued)

*Primary Examiner* — Tom Y Lu
(74) *Attorney, Agent, or Firm* — Sughrue Mion, PLLC

(57) ABSTRACT

A system according to an aspect of the present disclosure includes: at least one memory configured to store instructions; and at least one processor configured to execute the instructions to: determine a type of a road surface mark and a degree of abrasion of the road surface mark from a road surface image taken of a road surface; and display different types of icons for each type of road surface mark on one map based on position information about a location at which the road surface image is captured, each of the icons representing the degree of abrasion of the respective road surface mark.

15 Claims, 8 Drawing Sheets

(56) References Cited

FOREIGN PATENT DOCUMENTS

| | | | | |
|---|---|---|---|---|
| JP | 2020-160840 A | | 10/2020 | |
| JP | 2020160840 | * | 10/2020 | ............... G06T 7/00 |
| JP | 2021-049968 A | | 4/2021 | |

OTHER PUBLICATIONS

English translation of Written opinion for PCT Application No. PCT/JP2021/047468, mailed on Apr. 5, 2022.

* cited by examiner

SYSTEM, METHOD, AND RECORDING MEDIUM

This application is a National Stage Entry of PCT/JP2021/047468 filed on Dec. 22, 2021, the contents of all of which are incorporated herein by reference, in their entirety.

TECHNICAL FIELD

The present disclosure relates to a management assistance system and the like.

BACKGROUND ART

For safety on the road and smooth traffic, road signs, road surface marks, and traffic signals are provided on the road. The road surface mark drawn on the road surface wears over time. Therefore, it is necessary to manage the abrased road surface mark.

PTL 1 discloses a road surface mark defect detection device that classifies the presence or absence of a road surface mark and the type of the road surface mark from an image obtained by imaging a road, and displays a marker indicating a position where the road surface mark has been detected on a map. In PTL 1, the marker is displayed in such a display mode that the degree of fading of the road surface mark can be recognized.

CITATION LIST

Patent Literature

PTL 1: JP 2020-160840 A

SUMMARY OF INVENTION

Technical Problem

There is a plurality of types of road surface marks such as a stop line, a crosswalk, and a stop character. In PTL 1, it is difficult to grasp at a glance which type of road surface mark the degree of abrasion of the plurality of types of road surface marks shown on the map represents.

An object of the present disclosure is to provide a management assistance system that can easily grasp the degree of abrasion of a road surface mark for each of a plurality of types.

Solution to Problem

A management assistance system according to the present disclosure includes a determination means configured to determine a type of a road surface mark and a degree of abrasion of the road surface mark from a road surface image in which a road surface is captured, and a display control means configured to display degrees of abrasion of the respective road surface marks on one map using different types of icons for each type of road surface mark based on position information about a location at which the road surface image is captured.

A management assistance method according to the present disclosure includes determining a type of a road surface mark and a degree of abrasion of the road surface mark from a road surface image in which a road surface is captured, and displaying degrees of abrasion of the respective road surface marks on one map using different types of icons for each type of road surface mark based on position information about a location at which the road surface image is captured.

A program according to the present disclosure causes a computer to execute processing comprising: determining a type of a road surface mark and a degree of abrasion of the road surface mark from a road surface image in which a road surface is captured, and displaying degrees of abrasion of the respective road surface marks on one map using different types of icons for each type of road surface mark based on position information about a location at which the road surface image is captured. The program may be stored in a non-transitory computer-readable recording medium.

Advantageous Effects of Invention

According to the present disclosure, it is possible to easily grasp the degree of abrasion of the road surface mark for each of the plurality of types.

EXAMPLE EMBODIMENT

Hereinafter, example embodiments of a management assistance system, a management assistance method, a program, and a non-transitory recording medium that records the program according to the present disclosure will be described in detail with reference to the drawings. The present example embodiment does not limit the disclosed technology.

Figure 1:
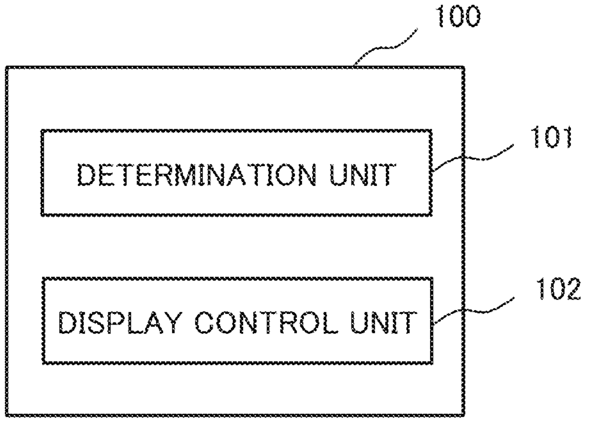
FIG. 1 is a block diagram illustrating a configuration example of a management assistance system 100 according to an example embodiment.

FIG. 1 is a block diagram illustrating a configuration example of a management assistance system 100 according to an example embodiment. The management assistance system 100 according to the example embodiment includes a determination unit 101 and a display control unit 102.

In one example embodiment, the management assistance system 100 is used to manage a road surface mark drawn with paint on a road. The road surface mark is a marking related to passage drawn on a road surface. The road surface mark includes a road mark, a section line, and an out-of-legal mark.

The road surface targeted by the management assistance system 100 is not limited to a general road on which vehicles and people pass, and includes a test course of a vehicle, a runway, a guide path, and the like of an airport. That is, the management assistance system 100 can widely target the road surface on which the road surface mark is drawn.

The determination unit 101 determines the type of the road surface mark and the degree of abrasion of the road surface mark from a road surface image in which a road surface is captured.

The road surface image is captured by an in-vehicle camera such as a drive recorder. However, the type of the camera is not limited thereto, and various types of cameras may be used. For example, the road surface image may be captured by a camera mounted on another moving body such as a bicycle or a drone, a camera carried by a person, or a fixed camera installed on a road. The road surface image may be captured by a person or may be automatically captured.

Figure 2:
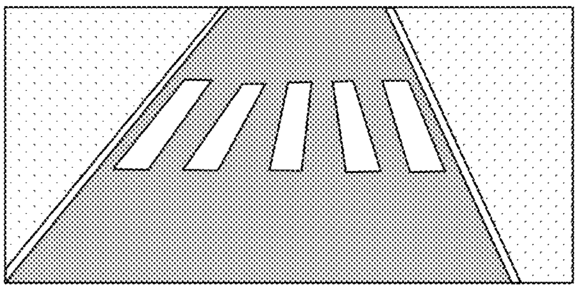
FIG. 2 is a diagram illustrating an example of a road surface image obtained by imaging a road.

FIG. 2 is a diagram illustrating an example of a road surface image obtained by imaging a road on which a car runs. In the road surface image of FIG. 2, a crosswalk, which is an example of a road surface mark, is imaged.

The road surface image captured by the camera may be stored in a database (not illustrated). At this time, the determination unit 101 may acquire the road surface image from the database. Alternatively, when the management assistance system 100 is connected to an any camera in such a way as to be able to communicate therewith in a wired or wireless manner, the determination unit 101 may acquire the road surface image from the camera.

The determination unit 101 acquires the road surface image and position information about a location where the road surface image is captured. The position information includes, for example, latitude and longitude, position information by a global navigation satellite system (GNSS) or a global positioning system (GPS), or a position on a map.

A method of acquiring the position is not particularly limited. A device that receives radio waves from a GNSS satellite may be provided in a moving body such as a camera or a car. For example, the determination unit 101 may acquire the position information about the newly captured road surface image by comparing the road surface image stored in the database in association with the position information with the newly captured road surface image.

Further, the determination unit 101 may acquire the road surface image and a date and time when the road surface image is captured.

The determination unit 101 detects, for example, a portion where a road surface mark is drawn from the acquired road surface image. The determination unit 101 detects the road surface mark by recognizing the color or the shape of the road surface mark by a known image recognition technique, for example. The road surface mark is generally drawn with white or yellow paint. However, the determination unit 101 may also detect road surface marks drawn in blue, green, and other colors.

There are many types of road surface marks. Examples of the type of the road surface mark include, but are not limited to, a stop line, a crosswalk, a stop character, a crosswalk notice, prohibition of line crossing for overtaking, a roadway center line, a roadway boundary line, and a roadway outer line.

For example, the determination unit 101 refers to a database of shapes of road surface marks, and determines the type of the road surface mark from the shape of a portion detected as the road surface mark being drawn. The method of determining the type of the road surface mark is not particularly limited. For example, the determination unit 101 may simultaneously detect the road surface mark and determine the type of the road surface mark. The determination unit 101 may determine the type of the road surface mark by image recognition using a model obtained by machine learning the road surface mark.

The determination unit 101 may use position information about a location where the road surface image is captured in order to determine the type of the road surface mark. For example, the determination unit 101 may refer to a database that stores a position and a type of road surface mark drawn at the position in association with each other. The determination unit 101 may determine the type of the road surface mark included in the road surface image from the position information about the location where the road surface image is captured by referring to the database.

The determination unit 101 may refer to a database that stores a road surface image captured in the past at a location where the road surface image is captured in order to determine the type of the road surface mark. For example, it is assumed that the current degree of abrasion is high and it is difficult to detect the road surface mark from the road surface image. In such a case, the road surface image captured in the past is expected to have a lower degree of abrasion than the current degree of abrasion. Therefore, by referring to the past image, the road surface mark to be included in the road surface image is recognized. Therefore, the accuracy of determining the type of road surface mark may be improved.

The determination unit 101 determines the degree of abrasion of the road surface mark for the road surface mark whose type has been determined. The degree of abrasion may be represented by a plurality of stages, for example, "high, medium, low". The degree of abrasion may be represented by a numerical value or a ratio. For example, a state where the road surface mark is not rubbed is assumed to have a degree of abrasion of 0%. For example, it is assumed that the degree of abrasion approaches 100% as the area where the color of the pavement of the road surface can be seen increases in the portion where the road surface mark is drawn. The degree of abrasion may be set in such a way that the value representing the degree of abrasion increases as the proportion of the rubbed portion increases. Alternatively, the degree of abrasion may be a degree of similarity to the shape of the unrubbed road surface mark stored in the database. In this case, the lower the similarity, the higher the degree of abrasion is set.

The method of determining the degree of abrasion of the road surface mark is not particularly limited. For example, the determination unit 101 may refer to the database of the shape of the road surface mark for each degree of abrasion, and simultaneously determines the type of road surface mark and determines the degree of abrasion. The degree of abrasion may be determined by a model obtained by machine learning the degree of abrasion of the road surface mark.

Figure 3:
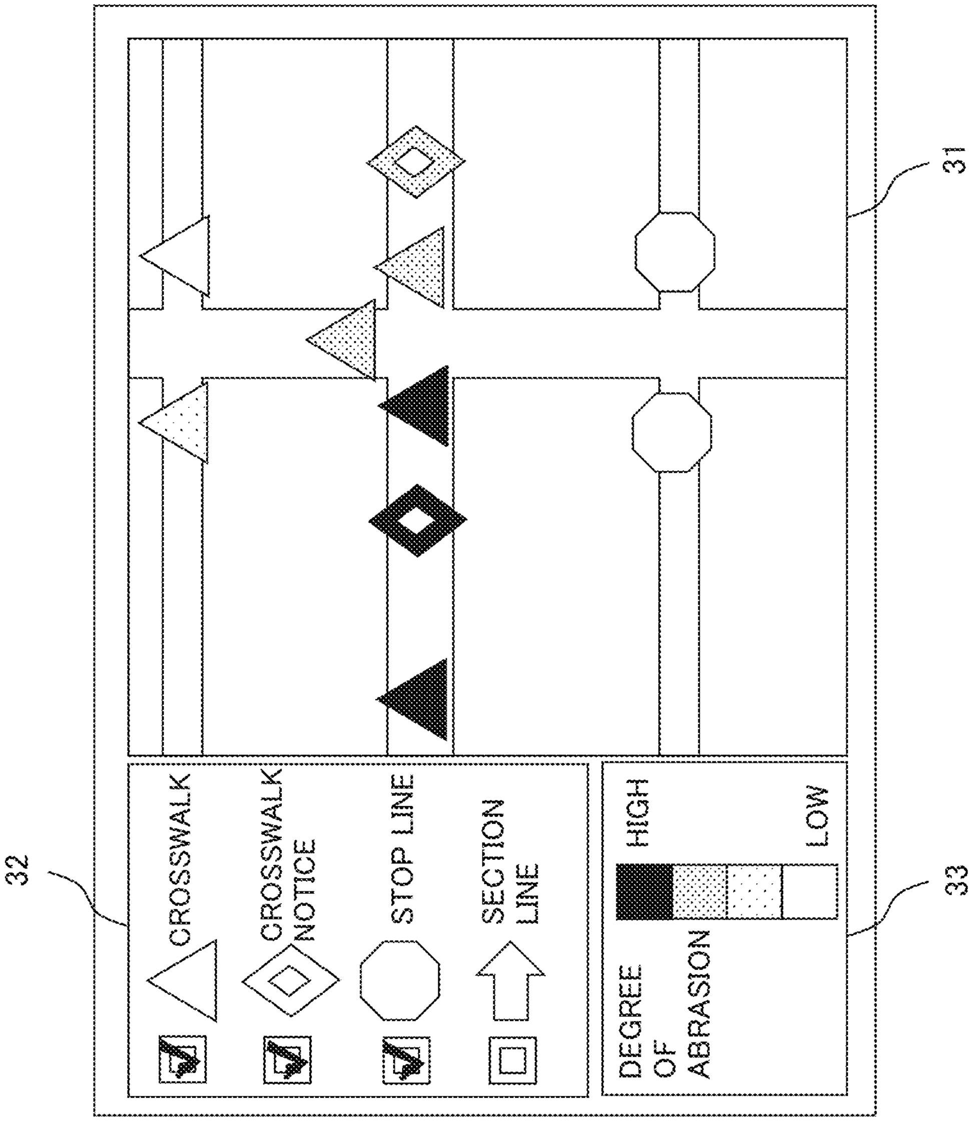
FIG. 3 is a diagram illustrating an example of a screen.

The display control unit 102 displays a map on a display (not illustrated) such as a display or a tablet connected to the computer. FIG. 3 is a diagram illustrating an example of a screen displayed on the display by the display control unit 102. The display control unit 102 displays a map 31. Although the number of maps 31 displayed on the screen of FIG. 3 is one, the display control unit 102 may display a plurality of maps on the screen.

The display control unit 102 displays the degree of abrasion of each road surface mark on one map by different types of icons for each type of road surface mark based on the position information about the location where the road surface image is captured. The icon includes a symbol and a symbol.

As an example, the display control unit 102 superimposes and displays an icon on a map. For example, with respect to the road surface image acquired by the determination unit 101, the display control unit 102 identifies a position related to the map 31 of the road surface mark from position information about a location where the road surface image is captured. The display control unit 102 displays an icon representing the road surface mark at the identified position on the map 31.

When the acquired position information indicates a location other than the road on the map 31, the display control unit 102 may identify a position close to a position indicated by the position information and related to the road on the map 31. According to such a configuration, the error of the position information is corrected.

The icon displayed by the display control unit 102 indicates the type of road surface mark and the degree of abrasion. The display control unit 102 displays an icon in which the type of the road surface mark is represented by one attribute of the icon and the degree of abrasion is represented by another attribute different from the attribute indicating the road surface mark.

The attributes of the icon include, for example, a color, a pattern, a size, and a shape of the icon. However, the attributes of the icon are merely examples, and are not limited thereto. As illustrated in FIG. 3, for example, the display control unit 102 may display an icon in which the type of the road surface mark is represented by the shape of the icon and the degree of abrasion of the road surface mark is represented by the color of the icon. The legend 32 indicates the type of road surface mark represented by the shape of the icon. The legend 33 indicates the degree of abrasion represented by the color of the icon.

When the degree of abrasion is represented by the color of the icon, it may be indicated that the darker the color, the higher the degree of abrasion is. The display control unit 102 may assign and display a color for each range of the degree of abrasion. For example, the display control unit 102 may represent a road surface mark whose degree of abrasion has a predetermined height by a red icon. The display control unit 102 may represent a road surface mark whose degree of abrasion has a predetermined lowness by a green icon. When the degree of abrasion is represented by the size, it may be indicated that the larger the size of the icon, the higher the degree of abrasion.

The road surface mark and the degree of abrasion may be represented by a combination of a plurality of attributes. For example, the degree of abrasion may be represented by both the color and size of the icon.

The attribute of the icon does not need to be different for all types of road surface marks. That is, different types of road surface marks may be represented by the icon having the same attribute. For example, the road surface marks of the crosswalk and the crosswalk notice may be represented by the icon having the same shape.

The display control unit 102 displays two or more types of icons representing different types of road surface marks on one map 31 in such a way that the user can distinguish and recognize a plurality of types of road surface marks. Therefore, the degree of abrasion of the road surface mark is displayed for each type on the map 31. However, depending on the display range of the map, only one type of road surface mark may be displayed.

The display control unit 102 may receive selection, of a road surface mark, by which an icon is displayed. For example, the display control unit 102 may control whether to display a corresponding type of icon of the road surface mark in response to selection of the checkbox in the legend 32.

Figure 4:
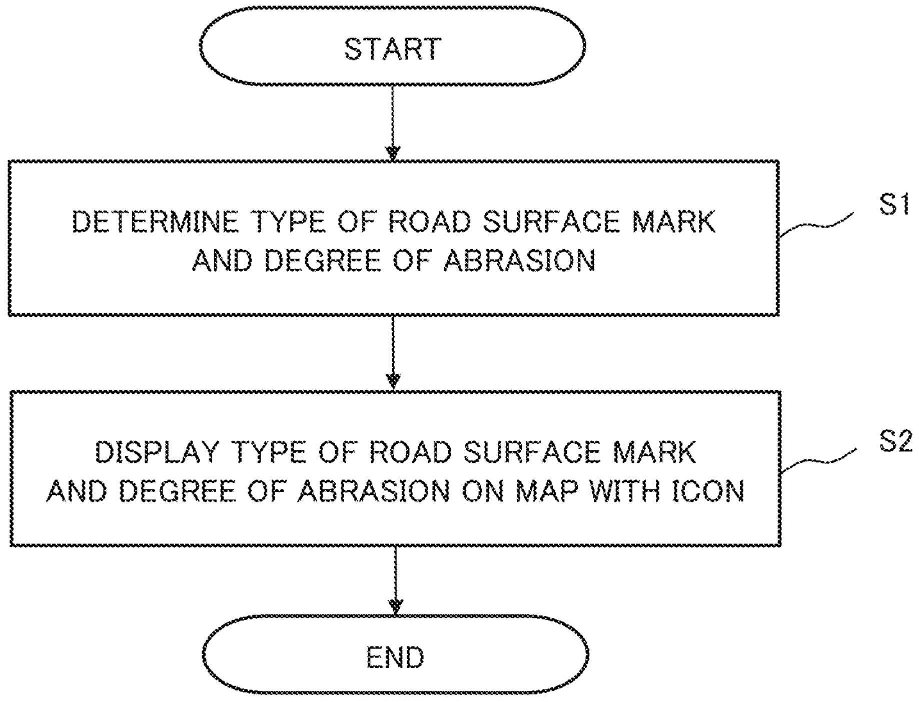
FIG. 4 is a flowchart illustrating an operation example of the management assistance system 100 according to an example embodiment.

FIG. 4 is a flowchart illustrating an operation example of the management assistance system 100 according to an example embodiment. The determination unit 101 of the management assistance system 100 determines the type of the road surface mark and the degree of abrasion of the road surface mark from a road surface image in which a road surface is captured (step S1). The determination unit 101 delivers the determined type and degree of abrasion of the road surface mark to the display control unit 102. In step S1, the determination unit 101 may further acquire position information about a location where the road surface image is captured.

The display control unit 102 displays the degree of abrasion of each road surface mark on one map with different types of icons for each type of road surface mark based on the position information about the location where the road surface image is captured (step S2). In step S2, the display control unit 102 may acquire, for example, position information about the location where the road surface image is captured from the determination unit 101. Further, the display control unit 102 may identify the position of the road surface mark from the acquired position.

As described above, in one example embodiment, the management assistance system 100 displays the degree of abrasion of each road surface mark on one map using different types of icons for each type of road surface mark. As a result, the user can easily grasp the degree of abrasion of the road surface mark for each of the plurality of types.

The example embodiment is not limited to the example described above, and various modifications can be made. The determination unit 101 and the display control unit 102 may be achieved by one device. Alternatively, the determination unit 101 and the display control unit 102 may be achieved by a plurality of devices.

The display control unit 102 may display an icon for each type of road surface mark in various modes. Specific examples of various display modes will be described below.

Figure 5:
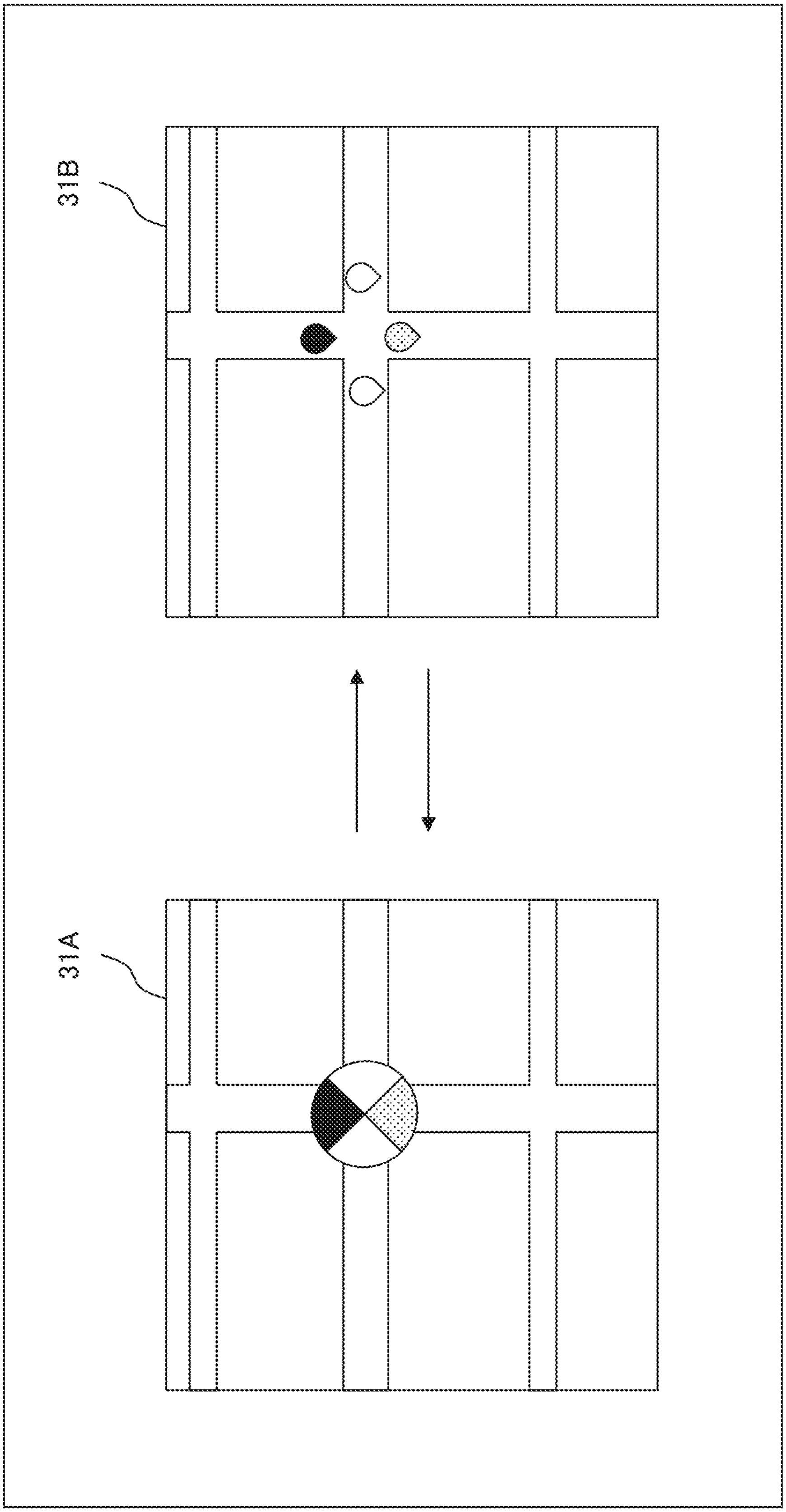
FIG. 5 illustrates a display example of an icon representing a crosswalk.

The display control unit 102 may display an icon in which the degree of abrasion of the road surface mark representing each of crosswalks surrounding the intersection is represented by the attribute of each region in each of the regions obtained by dividing one icon. FIG. 5 illustrates a plurality of display examples of icons representing crosswalks surrounding an intersection. For the sake of simplicity, FIG. 5 does not illustrate an icon of the road surface mark other than icons of crosswalks surrounding an intersection. In the map 31A, the degrees of abrasion of road surface marks representing four crosswalks surrounding an intersection are represented by respective regions obtained by dividing one icon into four.

In the map 31B, the degrees of abrasions of the road surface marks representing the four crosswalks surrounding the intersection are represented by different icons. The display control unit 102 may display a display mode in which the degree of abrasion is represented by using an icon for each intersection as in the map 31A, and a display mode in which the degree of abrasion is represented by using an icon for each crosswalk as in the map 31B and switch between the two display modes. The display control unit 102 may and display the display modes by switching between the display modes according to selection by the user.

The display control unit 102 may switch between displaying an icon for each intersection and displaying an icon for each crosswalk according to the range indicated by the map to be displayed. For example, when displaying the wide area map, the display control unit 102 displays an icon for each intersection. When displaying the narrow area map, the display control unit 102 displays an icon for each crosswalk. The wide area map is generally a map representing a wide range by zooming out. The narrow area map is generally a map representing a narrow range by zooming in. The display control unit 102 may switch between a display mode in which the degree of abrasion is represented for each intersection and a display mode in which the degree of abrasion is represented for each crosswalk according to the scale of the map to be displayed.

Figure 6:
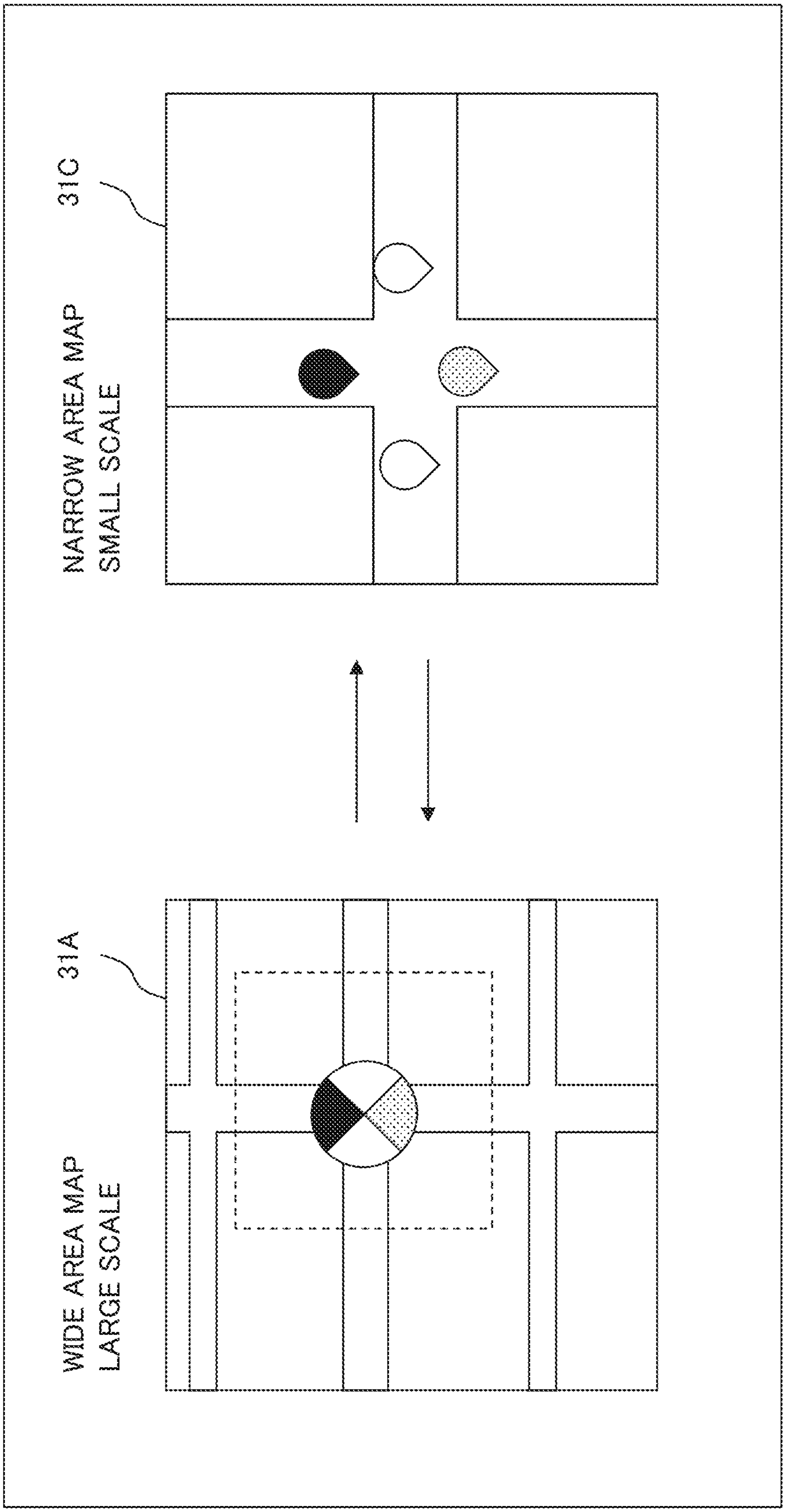
FIG. 6 illustrates another display example of an icon representing a crosswalk.

FIG. 6 illustrates another display example of icons representing crosswalks surrounding an intersection. In a case where a wide area map or a map with a large scale is displayed, an icon may be displayed for each intersection as in the map 31A. In a case where a narrow area map or a map with a small scale is displayed, an icon may be displayed for each crosswalk as in the map 31C.

Figure 7:
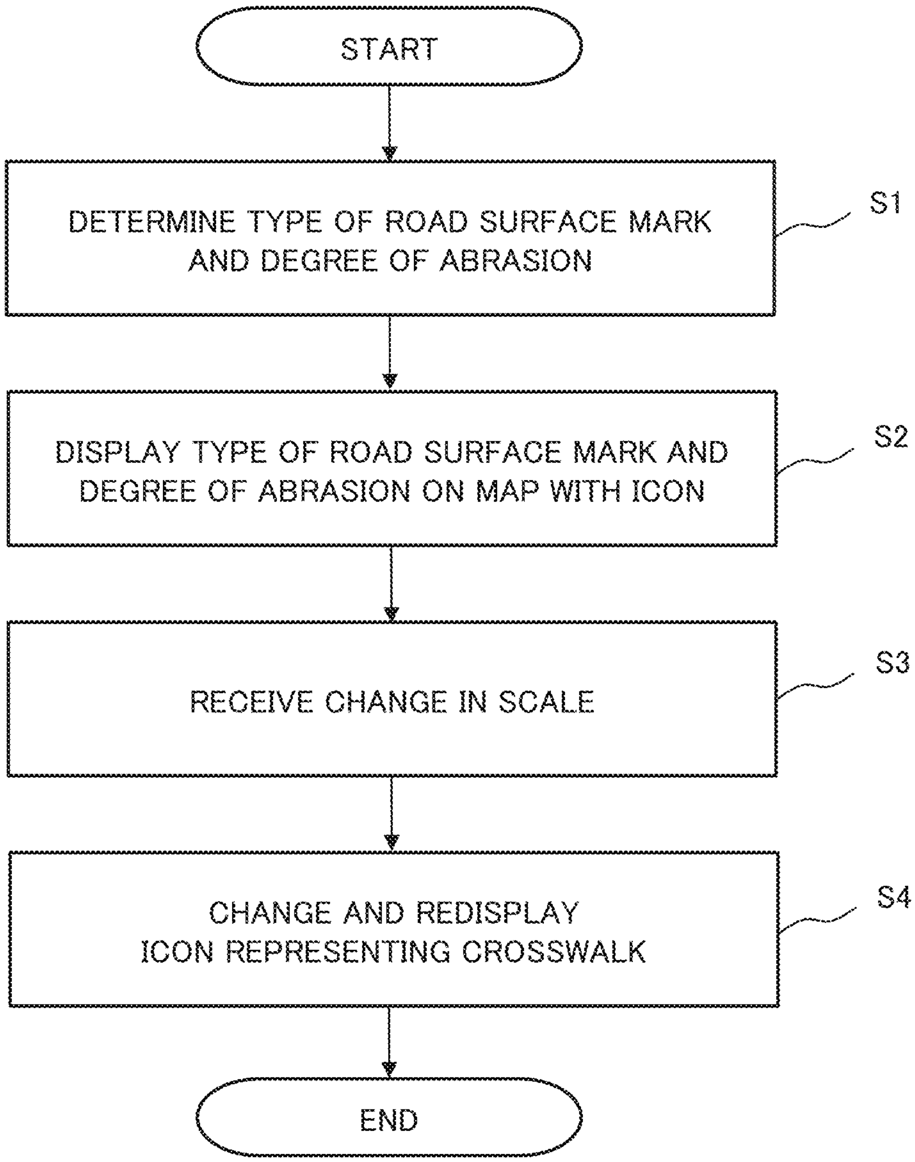
FIG. 7 is a flowchart illustrating another operation example of the management assistance system 100.

FIG. 7 is a flowchart illustrating an operation example of the management assistance system 100 in a case where the display is switched. Steps S1 and S2 in FIG. 7 are similar to steps S1 and S2 in FIG. 4, so that the description thereof is omitted.

After step S2, the display control unit 102 receives a change in scale (step S3). Thereafter, the display control unit 102 changes the icon representing the crosswalk and then displays again the degrees of abrasion of the plurality of types of road surface marks (step S4). In step S4, the display control unit 102 displays the degree of abrasion on a map having a scale different from that of the map displayed in step S2.

In addition, when a predetermined number or more of road surface marks are included in one map, the display control unit 102 may limit the number of icons to be displayed. The threshold value for the predetermined number may be appropriately determined, for example, in such a way that the density obtained from the area of the map and the number of icons to be displayed is less than a predetermined value.

When a partial region in one map includes a predetermined number or more of road surface marks, the display control unit 102 may limit the number of icons displayed in the partial region. The partial region is a region obtained by dividing the map in a predetermined range. The number of icons to be displayed may be determined for each partial region. As a result, it is possible to prevent icons from being densely displayed in some partial regions. The shape of the partial region is determined to be, for example, a circle, a square, or the like, but the shape is not particularly limited. The predetermined range for dividing the map is appropriately determined, for example, by the size of the map. A case where the partial region includes a predetermined number or more of road surface marks includes a case where two road surface marks exist within a predetermined distance.

For example, the display control unit 102 performs control to display icons for some road surface marks. For example, the display control unit 102 may display some of a plurality of road surface marks having a short distance as icons, and omit display of the icons for the remaining road surface marks. For example, the display control unit 102 may display an icon of a road surface mark having a high degree of abrasion and omit display of an icon of a road surface mark having a low degree of abrasion.

The display control unit 102 may display the same type of road surface mark within a predetermined distance with one icon. For example, the display control unit 102 may calculate a representative value representing the degree of abrasion of the plurality of road surface marks. The representative value represents, for example, an average degree of abrasion of a plurality of road surface marks. Alternatively, the representative value represents the degree of abrasion of the road surface mark having the highest degree of abrasion among the plurality of road surface marks. The display control unit 102 displays a plurality of road surface marks with one icon based on the calculated representative value.

For example, the display control unit 102 may limit the number of icons to be displayed in the partial region by displaying the degrees of abrasion of at least two or more road surface marks in the partial region with one icon.

The display control unit 102 may display or control the same type of road surface mark with one icon based on conditions other than the distance. For example, the display control unit 102 may display or control a plurality of road surface marks with one icon for each unit to be repaired. As an example, the adjacent roads are repaired in the same unit. Therefore, the road surface marks of the adjacent roads may be displayed with one icon. Even when the two-dimensional distance is short, a plurality of roads that intersect three-dimensionally or a general road and an expressway may have different units of repair. Therefore, the road surface marks drawn on these roads may be displayed with separate icons.

The icon in which the degrees of abrasion of a certain type of road surface mark are collected may have an attribute different from that of the icon representing the degree of abrasion of each road surface mark. That is, the shape of the icon in which the plurality of road surface marks is collected may be different from the shape of the icon representing the degree of abrasion of each road surface mark.

The display control unit 102 may display an icon representing the degree of abrasion based on the display priority determined for each type of road surface mark. For example, the display control unit 102 performs control to display icons for some types of road surface marks based on the display priority. The display control unit 102 may perform control to display icons for some types of road surface marks based on the display priority only when there are many road surface marks included in the map. For example, the display control unit 102 displays a predetermined number of icons representing road surface marks in descending order of display priority. Alternatively, the display control unit 102 highlights some types of road surface marks based on the display priority.

The display priority may be set by the user. This is because the type of road surface mark that is emphasized may vary depending on the user. For example, the user may set the display priority of the crosswalk and the stop line to be high. According to such a setting, the display control unit 102 does not display road surface marks of types other than the crosswalk and the stop line.

The display priority may be determined based on a parameter related to a road corresponding to a road surface. The parameter related to the road indicates a feature related to a traffic situation of the road. The management assistance system 100 may further include a determination unit that determines a display priority based on a parameter related to a road. The parameter related to the road is stored in an any database in association with the position of the road.

The parameters related to the road include, for example, traffic accident information, traffic violation information, a risk level, neighboring facility information, a traffic volume, and a pedestrian amount at a location where the road surface image is captured. The display priority may be determined based on a plurality of parameters related to the road.

The traffic accident information and the traffic violation information indicate whether a traffic accident or a traffic violation has occurred or the number of occurrences. The display priority of a type of road surface mark for preventing a traffic accident, the road surface mark being drawn on a road where there are many traffic accidents and traffic violations, may be determined to be high. The road surface marks for preventing a traffic accident are, for example, a stop line, a stop character, and a speed limit display.

The risk level represents a risk level according to the shape of the road. For example, the risk level represents poor visibility of the road or whether the road is curved. Among the road surface marks drawn on the road having a high risk level, for example, the display priority of a type of road surface mark that urges a driver to pay attention can be determined to be high. The road surface mark that urges a driver to pay attention is, for example, a character string such as "slow down". For a road with a large traffic volume, for example, the display priority of the section line can be determined to be high.

The neighboring facility information indicates whether there is a facility requiring attention such as a school in the vicinity of the road. In a road in the vicinity of which there is a school or a road where there are many pedestrians, for example, display priority of a crosswalk and a crosswalk notice drawn on the road can be determined to be high.

The display modes of various icons by the display control unit 102 have been described above. The display control unit 102 may display various other pieces of information on the screen. Specific examples of information that can be displayed are shown below.

Figure 8:
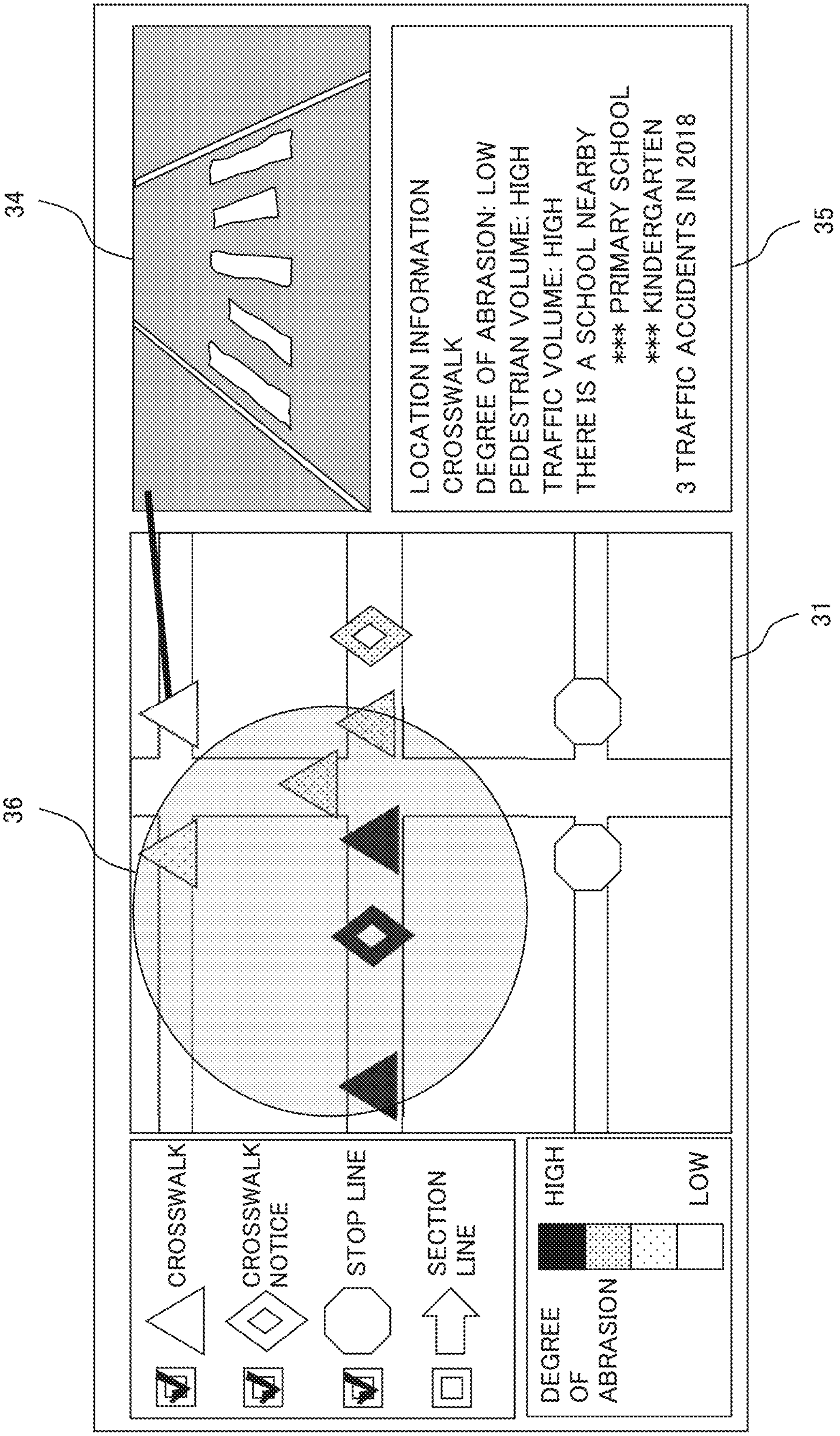
FIG. 8 is a diagram illustrating another example of the screen.

FIG. 8 is a diagram illustrating another example of the screen displayed on the display. The display control unit 102 may display a road surface image 34 together with the map 31. The display control unit 102 may display the road surface image 34 of the location related to the selected icon in response to the selection of the icon by the user.

The display control unit 102 may display additional information 35 related to the location where the road surface image is captured. The additional information 35 is, for example, the type of the road surface mark and the degree of abrasion of the road surface mark at the location where the road surface image is captured. The additional information 35 may include a parameter related to the road described above. The display control unit 102 may display the additional information 35 about the location related to the selected icon in response to the selection of the icon by the user.

The display control unit 102 may display additional information 35 different for each type of road surface mark. For example, when there is a crosswalk at the location where the road surface image is captured, the pedestrian amount may be displayed, and when there is no crosswalk, the pedestrian amount may not be displayed.

Further, the display control unit 102 may display the repair priority. The repair priority indicates the priority of repainting of the road surface mark. The user can make a plan for repainting the road surface mark based on the repair priority. The repair priority may be determined based on the degree of abrasion of the road surface mark and the display priority for each type of the road surface mark described above. The management assistance system 100 may include a determination unit that determines a repair priority. The repair priority may be included in an example of the additional information 35.

The display control unit 102 may display a list of road surface marks in descending order of repair priority. The display control unit 102 may receive selection of listed road surface marks. Then, the display control unit 102 may display the map 31 indicating the position of the selected road surface mark according to the selection.

The display control unit 102 may display a partial region on the map 31 as an emphasis region 36 in a mode different from modes of other regions. The different mode includes, for example, displaying in a different color. The emphasis region 36 indicates, for example, a region having a higher degree of abrasion than other regions.

In FIG. 8, the emphasis region 36 is indicated by a circle. However, the display mode of the emphasis region 36 is not limited to a circular shape, and a quadrangle or another shape may be set. In the emphasis region 36, a road to be emphasized may be displayed in a color different from colors of other roads.

For example, the display control unit 102 may display the emphasis region 36 in red and display the other regions in blue. By displaying the emphasis region 36, the user can preferentially check the degree of abrasion for each type of road surface mark in the emphasis region 36.

Hardware Configuration

In the above-described example embodiment, each component of the management assistance system 100 indicates a block of a functional unit. Part or all of each component may be achieved by an any combination of the computer 500 and the program.

Figure 9:
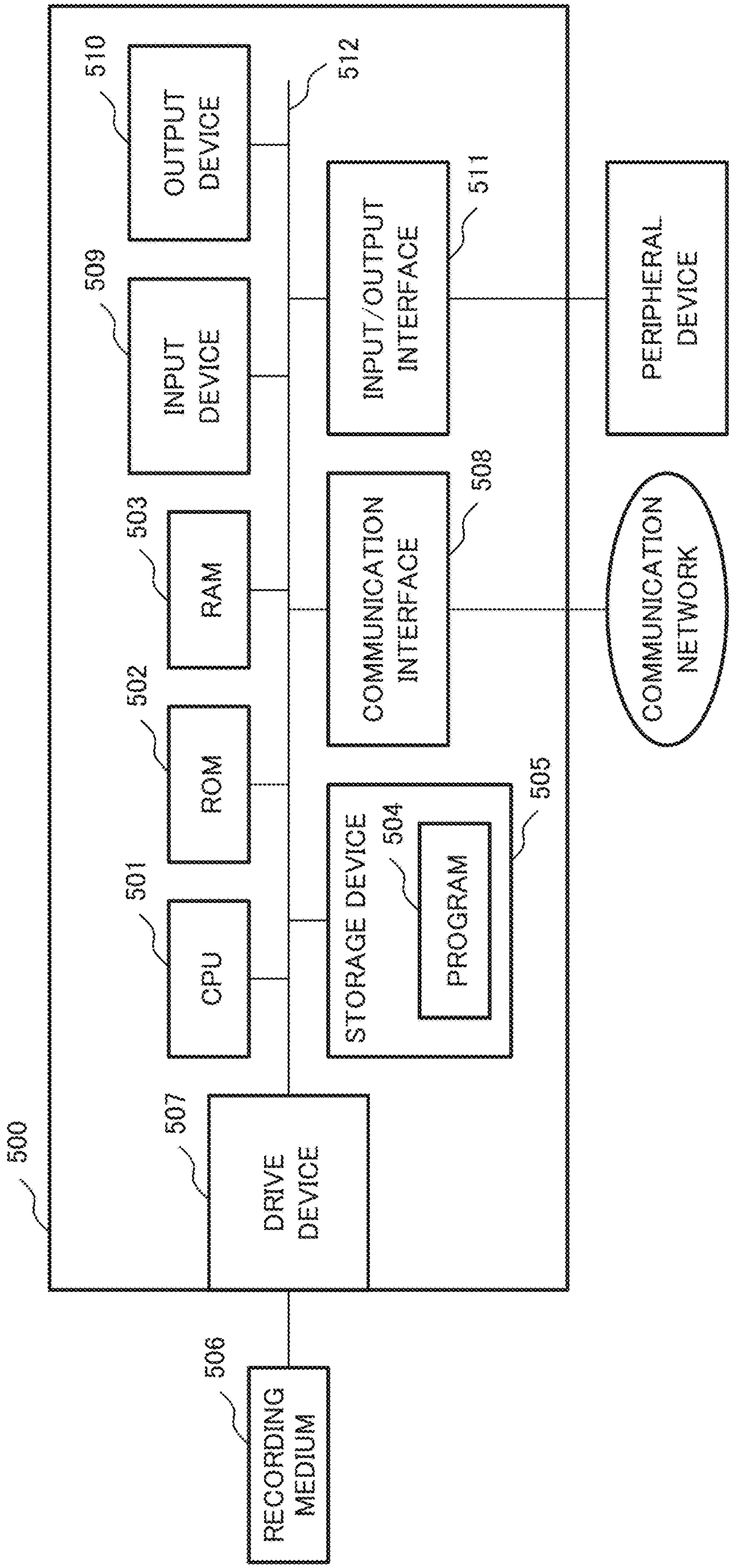
FIG. 9 is a block diagram illustrating an example of a hardware configuration.

FIG. 9 is a block diagram illustrating an example of a hardware configuration of the computer 500. Referring to FIG. 9, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes an instruction for implementing each function of the management assistance system 100. The program 504 is stored in advance in the ROM 502, the RAM 503, and the storage device 505. The CPU 501 achieves each function of the management assistance system 100 by executing a command included in the program 504. For example, the CPU 501 of the management assistance system 100 executes a command included in the program 504 to implement the function of the management assistance system 100. The RAM 503 may store data processed by each function of the management assistance system 100. For example, the road surface image may be stored in the RAM 503 of the computer 500.

The drive device 507 reads and writes the recording medium 506. The communication interface 508 provides an interface with a communication network. The input device 509 is, for example, a mouse, a keyboard, or the like, and receives an input of information from the user. The output device 510 is, for example, a display, to output (displays) information to the user. The input/output interface 511 provides an interface with a peripheral device. The bus 512 connects the components of the hardware. The program 504 may be supplied to the CPU 501 via a communication network, or may be stored in the recording medium 506 in advance, read by the drive device 507, and supplied to the CPU 501.

The hardware configuration illustrated in FIG. 9 is an example, and other components may be added or some components may not be included.

There are various modifications of the method of implementing the management assistance system 100. For example, the management assistance system 100 may be achieved by an any combination of a computer and a program different for each component. A plurality of components included in the management assistance system 100 may be achieved by an any combination of one computer and a program.

Some or all of the components of the management assistance system 100 may be achieved by general-purpose or dedicated circuitry including a processor or the like, or a combination thereof. These circuits may be configured by a single chip or may be configured by a plurality of chips connected via a bus. Some or all of the components of the management assistance system 100 may be achieved by a combination of the above-described circuit and the like and a program.

In a case where some or all of the components of the management assistance system 100 are achieved by a plurality of computers, circuits, and the like, the plurality of computers, circuits, and the like may be disposed in a centralized manner or in a distributed manner.

At least part of the management assistance system 100 may be provided in a software as a service (Saas) format. That is, at least part of the functions for implementing the management assistance system 100 may be executed by software executed via a network.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims. The configurations in the respective example embodiments can be combined with each other without departing from the scope of the present disclosure.

Some or all of the above example embodiments may be described as the following Supplementary Notes, but are not limited to the following.

Supplementary Note 1

A management assistance system including an determination means configured to determine a type of a road surface mark and a degree of abrasion of the road surface mark from a road surface image in which a road surface is captured, and a display control means configured to display degrees of abrasion of the respective road surface marks on one map using different types of icons for each type of road surface mark based on position information about a location at which the road surface image is captured.

Supplementary Note 2

The management assistance system according to Supplementary Note 1, wherein the display control means displays an icon in which one attribute of the icon represents a type of a road surface mark, and another attribute different from the one attribute represents a degree of abrasion.

Supplementary Note 3

The management assistance system according to Supplementary Note 2, wherein an attribute of the icon is any of a color, a pattern, a size, and a shape.

Supplementary Note 4

The management assistance system according to Supplementary Note 2 or 3, wherein the display control means displays an icon in which a degree of abrasion of a road surface mark representing each of crosswalks surrounding an intersection is represented by the another attribute in each of regions obtained by dividing one icon.

Supplementary Note 5

The management assistance system according to Supplementary Note 4, wherein the display control means displays a display mode in which degrees of abrasion of road surface marks representing respective crosswalks surrounding the intersection are represented by separate icons and a display mode in which the degrees of abrasion are represented by respective regions obtained by dividing one icon by switching between the two display modes.

Supplementary Note 6

The management assistance system according to Supplementary Note 5, wherein the display control means displays a display mode in which degrees of abrasion of road surface marks representing respective crosswalks surrounding the intersection are represented by separate icons and a display mode in which the degrees of abrasion are represented by respective regions obtained by dividing one icon by switching between the two display modes according to a scale of a map.

Supplementary Note 7

The management assistance system according to any one of Supplementary Notes 1 to 6, wherein in a case where a predetermined number or more of road surface marks are included in the one map, the display control means display icons by restricting the number of the icons to be displayed.

Supplementary Note 8

The management assistance system according to any one of Supplementary Notes 1 to 7, wherein in a case where a predetermined number or more of road surface marks are included in a partial region in the one map, the display control means display icons by restricting the number of the icons to be displayed in the partial region.

Supplementary Note 9

The management assistance system according to any one of Supplementary Notes 1 to 8, wherein
the display control means display a same type of road surface marks within a predetermined distance using one icon.

Supplementary Note 10

The management assistance system according to any one of Supplementary Notes 1 to 9, wherein
the display control means displays the icons based on a display priority determined for each type of road surface marks.

Supplementary Note 11

The management assistance system according to Supplementary Note 10, wherein
the display priority is determined based on a parameter related to a road corresponding to the road surface.

Supplementary Note 12

The management assistance system according to Supplementary Note 11, wherein
the parameter related to the road is at least one of traffic accident information, traffic violation information, a risk level, neighboring facility information, a traffic volume, and a pedestrian volume at a location where a road surface image is captured.

Supplementary Note 13

The management assistance system according to any one of Supplementary Notes 10 to 12, wherein
the display control means displays a repair priority of a road surface mark determined based on the degree of abrasion and the display priority for each type of the road surface marks.

Supplementary Note 14

The management assistance system according to any one of Supplementary Notes 1 to 13, wherein
the display control means displays additional information about a location where the road surface image is captured in response to selection of the icon by a user.

Supplementary Note 15

The management assistance system according to Supplementary Note 14, wherein
the display control means displays the additional information different for each type of road surface mark.

Supplementary Note 16

A management assistance method including
determining a type of a road surface mark and a degree of abrasion of the road surface mark from a road surface image in which a road surface is captured, and
displaying degrees of abrasion of the respective road surface marks on one map using different types of icons for each type of road surface mark based on position information about a location at which the road surface image is captured.

Supplementary Note 17

A recording medium non-transiently recording a program for causing a computer to execute processing comprising
determining a type of a road surface mark and a degree of abrasion of the road surface mark from a road surface image in which a road surface is captured, and
displaying degrees of abrasion of the respective road surface marks on one map using different types of icons for each type of road surface mark based on position information about a location at which the road surface image is captured.

REFERENCE SIGNS LIST

100 management assistance system
101 determination unit
102 display control unit
31 map
32, 33 legend
34 road surface image
35 additional information
36 emphasis region

What is claimed is:

1. A system comprising:
at least one memory configured to store instructions; and
at least one processor configured to execute the instructions to:
determine a type of a road surface mark and a degree of abrasion of the road surface mark from a road surface image taken of a road surface; and
display different types of icons for each type of road surface mark on one map based on position information about a location at which the road surface image is captured, each of the icons representing the degree of abrasion of the respective road surface mark
wherein the different types of icons each have a first attribute and a second attribute, the first attribute representing the type of the road surface mark, and the second attribute representing the degree of abrasion, and
at least one of the different types of icons includes divided regions each representing, with the second attribute, the degree of abrasion of the road surface mark of one of crosswalks surrounding an intersection.

2. The system according to claim 1, wherein
one of the attributes of the icon is any of a color, a pattern, a size, and a shape.

3. The system according to claim 1, wherein the at least one processor is further configured to execute the instructions to:
switch between a first display mode and a second display mode, the first display mode displaying the icons each separately representing the degree of abrasion of road surface mark of one of crosswalks surrounding the intersection, and the second display mode displaying the icon including the divided regions each representing the degree of abrasion.

4. The system according to claim 3, wherein the at least one processor is further configured to execute the instructions to:
switch between the first display mode and the second display mode according to a scale of the map.

5. The system according to claim 1, wherein the at least one processor is further configured to execute the instructions to:

in a case where a predetermined number or more of road surface marks are included in the map, restrict the number of the icons to be displayed.

6. The system according to claim 1, wherein the at least one processor is further configured to execute the instructions to:

in a case where a predetermined number or more of road surface marks are included in a partial region in the map, restrict the number of the icons to be displayed in the partial region.

7. The system according to claim 1, wherein the at least one processor is further configured to execute the instructions to:

display a same type of road surface marks within a predetermined distance using one icon.

8. The system according to claim 1, wherein the at least one processor is further configured to execute the instructions to:

display icons based on a display priority determined for each type of road surface marks.

9. The system according to claim 8, wherein the display priority is determined based on a parameter related to a road corresponding to the road surface.

10. The system according to claim 9, wherein the parameter related to the road is at least one of traffic accident information, traffic violation information, a risk level, neighboring facility information, a traffic volume, and a pedestrian volume at a location where a road surface image is captured.

11. The system according to claim 8, wherein the at least one processor is further configured to execute the instructions to:

display a repair priority of a road surface mark determined based on the degree of abrasion and the display priority for each type of the road surface marks.

12. The system according to claim 1, wherein the at least one processor is further configured to execute the instructions to:

display additional information about a location where the road surface image is captured in response to selection of the icon by a user.

13. The system according to claim 12, wherein the at least one processor is further configured to execute the instructions to:

display the additional information different for each type of road surface mark.

14. A method comprising:

determining a type of a road surface mark and a degree of abrasion of the road surface mark from a road surface image taken of a road surface; and displaying different types of icons for each type of road surface mark on one map based on position information about a location at which the road surface image is captured, each of the icons representing the degree of abrasion of the respective road surface mark;

wherein the different types of icons each have a first attribute and a second attribute, the first attribute representing the type of the road surface mark, and the second attribute representing the degree of abrasion, and at least one of the different types of icons includes divided regions each representing, with the second attribute, the degree of abrasion of the road surface mark of one of crosswalks surrounding an intersection.

15. A non-transitory recording medium recording a program for causing a computer to execute processing comprising:

determining a type of a road surface mark and a degree of abrasion of the road surface mark from a road surface image taken of a road surface; and displaying different types of icons for each type of road surface mark on one map based on position information about a location at which the road surface image is captured, each of the icons representing the degree of abrasion of the respective road surface mark;

wherein the different types of icons each have a first attribute and a second attribute, the first attribute representing the type of the road surface mark, and the second attribute representing the degree of abrasion, and at least one of the different types of icons includes divided regions each representing, with the second attribute, the degree of abrasion of the road surface mark of one of crosswalks surrounding an intersection.

* * * * *